United States Patent [19]

Yoshida et al.

[11] Patent Number: 5,691,416

[45] Date of Patent: Nov. 25, 1997

[54] (METH)ACRYLATE POLYMER PARTICLES DISPERSED IN EPOXY RESIN

[75] Inventors: Masatoshi Yoshida, Nara; Kenji Minami, Otu; Ichiro Namura, Suita; Masuji Izubayashi, Nishinomiya, all of Japan

[73] Assignee: Nippon Shokubai Co., Ltd., Osaka, Japan

[21] Appl. No.: 556,831

[22] Filed: Nov. 2, 1995

Related U.S. Application Data

[63] Continuation of Ser. No. 7,951, Jan. 22, 1993, abandoned, which is a continuation-in-part of Ser. No. 972,216, filed as PCT/JP92/01417 Nov. 2, 1992, abandoned.

[51] Int. Cl.$^6$ ............ C08K 5/04; C08L 63/00; C08L 63/02
[52] U.S. Cl. ............ 525/117; 523/408; 523/410; 523/411; 523/412; 525/65; 525/118
[58] Field of Search ............ 523/408, 410, 523/411, 412; 525/108, 117, 118

[56] References Cited

U.S. PATENT DOCUMENTS

| | | | |
|---|---|---|---|
| 3,833,683 | 9/1974 | Dickie et al. | 260/836 |
| 4,632,960 | 12/1986 | Sato et al. | 525/117 |
| 4,778,851 | 10/1988 | Henton et al. | 525/65 |
| 5,087,603 | 2/1992 | Izubayashi et al. | 503/226 |

FOREIGN PATENT DOCUMENTS

| | | |
|---|---|---|
| 0 351 027 | 1/1990 | European Pat. Off. |
| 52-36198 | 3/1977 | Japan. |
| 53-78237 | 7/1978 | Japan. |
| 54-80333 | 6/1979 | Japan. |
| 57-187376 | 11/1982 | Japan. |
| 61-163920 | 7/1986 | Japan. |
| 61-69827 | 10/1986 | Japan. |
| 62-22849 | 1/1987 | Japan. |
| 62-22850 | 1/1987 | Japan. |
| 62-50361 | 5/1987 | Japan. |
| 62-275149 | 11/1987 | Japan. |
| 63-86777 | 4/1988 | Japan. |
| 63-258913 | 10/1988 | Japan. |
| 1-6064 | 1/1989 | Japan. |
| 64-6064 | 1/1989 | Japan. |
| 1-158088 | 6/1989 | Japan. |
| 1-183582 | 7/1989 | Japan. |
| 2-80483 | 3/1990 | Japan. |
| 2-177948 | 5/1990 | Japan. |

*Primary Examiner*—Robert E. Sellers
*Attorney, Agent, or Firm*—Oblon, Spivak, McClelland, Maier & Neustadt, P.C.

[57] ABSTRACT

An epoxy resin composition which is tough and has excellent heat resistance and adhesion is obtained by dispersing, in an epoxy resin, polymer particles with a glass transition temperature of lower than 20° C. obtained by emulsion polymerization of a (meth)acrylic acid ester monomer by using, as an emulsifier, an end alkyl group-containing polymer with an acid value of greater than 200 or a salt thereof obtained by polymerization of a polymerizable monomer containing an unsaturated carboxylic acid in the presence of an alkyl mercaptan. The epoxy resin composition is useful, for example, as adhesives, molding materials, paints, sealants.

4 Claims, 1 Drawing Sheet

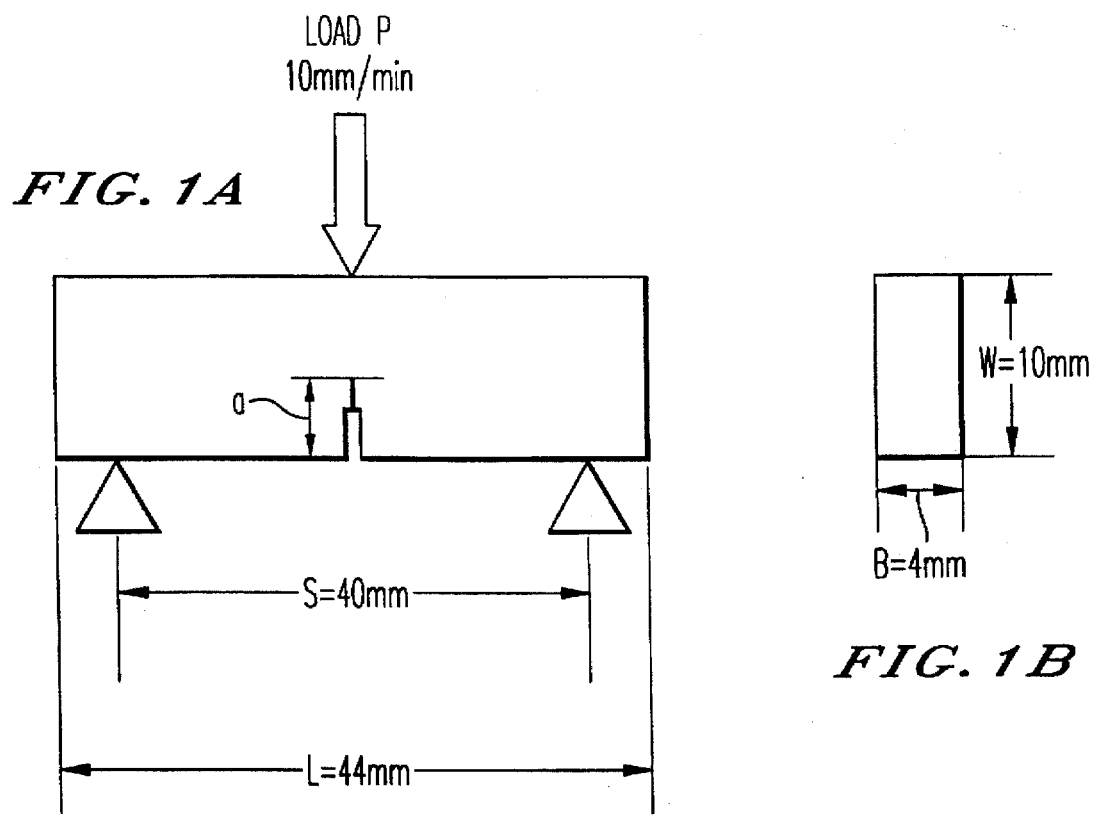
FIG. 1A
FIG. 1B
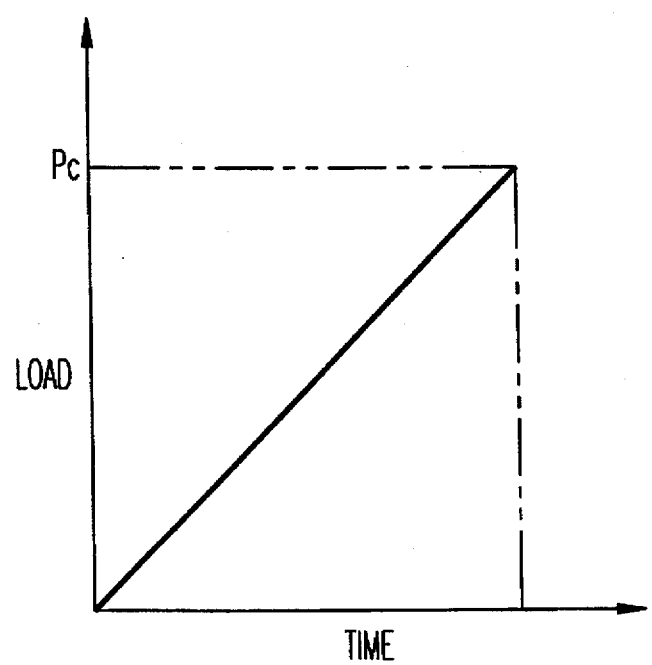
FIG. 2

(METH)ACRYLATE POLYMER PARTICLES DISPERSED IN EPOXY RESIN

This application is a Continuation of application Ser. No. 08/007,951, filed on Jan. 22, 1993, abandoned, which is a Continuation in Part of Ser. No. 07/972,216, filed on Nov. 5, 1992, abandoned, which was filed as International Application No. PCT/JP92/01417 on Nov. 2, 1992.

BACKGROUND OF THE INVENTION

1. Field of the Invention

The present invention concerns an epoxy resin composition which is tough and has excellent heat resistance and adhesion, and a method for producing the same. Epoxy resin compositions are extremely useful as adhesives, molding materials, paints and sealants.

2. Description of the Related Art

Since epoxy resins have well-balanced performance, for example, in thermal, mechanical and electrical characteristics, they have been generally utilized in various application uses such as adhesives, paints, materials for electric and electronic parts and constructing and building materials. However, since the epoxy resins have a drawback that curing products thereof are hard and brittle, there have been studied, for example, a method of blending a plasticizing ingredient or a method of using a monofunctional epoxy compound together, thereby reducing crosslink density for improving the drawback.

However, since heat resistant of the curing products is remarkably lowered, though the toughness is improved no fundamental solution has been provided, by such methods. In view of the above, a method of modifying an epoxy resin with various kinds of rubber has been considered. For example, there has been a method of introducing functional groups reactive with an epoxy resin or an epoxy resin curing agent into the molecule of a rubber and carrying out reaction under the coexistence of such a rubber in a curing reaction system of the epoxy resin. According to this method, the toughness of the epoxy resin is considerably improved and, depending on the case, a curing product of satisfactory heat resistance can be obtained. However, there has been a problem that the configuration of rubber particles to be dispersed is changed failing to provide an effective improvement for the toughness or the rubber is partially or entirely compatibilized with the epoxy resin to deteriorate the heat resistance depending on the kind of the curing agent used or the curing condition.

Further, there has also been known a method of adding modifying rubber particle obtained by emulsion polymerization into an epoxy resin, by which the foregoing problem can be solved, since this method causes no configurational change of the modifying rubber particles and compatibilization with the epoxy resin depending on the curing condition or the like. As the modifying method of this type the followings have been known. That is, Japanese Patent Laid Open Sho 52-36198 discloses a composition in which a curing agent is added to a mixture of an emulsified elastomer and a liquid or emulsified epoxy resin. Further, Japanese Patent Laid Open Sho 53-78237 discloses a paint composition comprising an acrylic emulsion, an epoxy resin and a corrosion resistant pigment.

The above-mentioned compositions are free from the configurational change of the modifying rubber particles upon curing reaction of the epoxy resin which otherwise deteriorates the modifying effect. However, since both of the epoxy resin and the modifying rubber particles are in the form of an aqueous dispersion, the range of application use is remarkably limited. On the other hand, compositions in which modifying rubber particles are directly dispersed in epoxy resins are disclosed, for example, in Japanese Patent Laid Open Sho 61-69827, 62-50361, 62-275149, 62-22849, 52-22850, Japanese Patent Laid Open Hei 2-80483 and Hei 2-117948. However, they involve the following problems:

(1) Since they relate to a method of once taking out an modifying rubber particles, as a powder, obtained by so-called core-shell polymerization and then mixing them with an epoxy resin, not only the production steps are complicate but also the improving effect is poor relative to the addition amount because they incorporate the shell ingredient having no direct concern with the improvement of the toughness.

(2) In the method of dispersion polymerization of a polymerizable monomer constituting the rubber in an epoxy resin can not increase the molecular weight of the rubber ingredient sufficiently but the rubber ingredient dissolved in the epoxy resin is increased to worsen the heat resistance.

(3) In a case of synthesizing the rubber particles by emulsion polymerization, they have no compatibility and reactiveness with an epoxy resin as an emulsifier and the toughness of the resultant epoxy resin composition is reduced or water absorption is increased since the water soluble material is used.

The present invention has been achieved taking notice of the foregoing situation and an object thereof is to provide an epoxy resin composition in which rubber particles not substantially compatible with an epoxy resin are uniformly dispersed not undergoing the effect of curing condition of the epoxy resin or the like, which entirely shows excellent toughness, moisture proofness, waterproofness and adhesion as a whole and which can be utilized generally as various kinds of molding materials, adhesives, paints and sealants.

SUMMARY OF THE INVENTION

An epoxy resin composition according to the present invention comprises (meth)acrylic acid ester type polymer particles (Pb) with a glass transition temperature of lower than 20° C. which are obtained by emulsion polymerization of a (meth)acrylic acid ester monomer (C) by using, as an emulsifier, a reactive surface active agent comprising a water soluble or water dispersible end alkyl group-containing polymer (Pa) having an acid value of greater than 200 and/or a salt thereof obtained by polymerizing a polymerizable monomer ingredient (A) containing an unsaturated carboxylic acid as an essential ingredient under the presence of an alkyl mercaptan (B) with 6 to 18 carbon atoms and which is dispersed in an epoxy resin. The epoxy resin composition can be obtained easily by homogeneously mixing aqueous emulsion of the (meth)acrylic acid ester polymer particles (Pb) obtained by the emulsion polymerization with the epoxy resin and then removing water from the aqueous liquid mixture.

BRIEF DESCRIPTION OF THE DRAWINGS

FIG. 1 is an explanatory view for the dimension of a sample used in examples for measuring the value of flucture toughness; and FIG. 2 is a graph illustrating a load-time relationship between upon measuring the value of flucture toughness.

DESCRIPTION OF THE PREFERRED EMBODIMENT

As for the rubber particles dispersed as a toughness improving ingredient into the epoxy resin, in the present invention, there is used (meth)acrylic acid ester polymer particles (Pb) with a glass transition temperature of lower than 20° C. obtained by emulsion polymerization of a (meth)acrylic acid ester monomer using, as an emulsifier, a reactive surface active agent comprising a water soluble or water dispersible end alkyl group-containing polymer (Pa) having an acid value of greater than 200 and/or a sail thereof obtained by polymerizing a polymerizable monomer ingredient (A) containing an unsaturated carboxylic acid as an essential ingredient under the presence of an alkyl mercaptan (B) with 6 to 18 carbon atoms.

One of the features of the present invention is to use a reactive surface active agent comprising a specific end alkyl group-containing polymer (Pa) and/or a salt thereof as an emulsifier upon preparing the (meth)acrylic acid ester polymer particles (Pb). For effectively giving a function as an emulsifier for emulsion polymerization and providing the (meth)acrylic acid ester type polymer particles (Pb) with a reactivity with the epoxy resin, it is necessary to use a water soluble or water dispersible end alkyl group-containing polymer (Pa) with an acid value of greater than 200 and the number average molecular weight thereof is preferably within a range from 300 to 7,000 and, particularly, 1,000 to 4,000.

The unsaturated carboxylic acid used for the synthesis of the end alkyl group-containing polymer (Pa) (hereinafter sometimes simply referred to as a polymer (Pa)) is used with an aim of providing the polymer with a hydrophilic property by the introduction of carboxyl groups, as well as introducing functional groups capable of reacting with the epoxy resin into the (meth)acrylic acid ester polymer particles (Pb) obtained by emulsion polymerization so that the emulsifier does not remain as an unreacted low molecular weight product in the epoxy resin composition. There is no particular restriction for the kind of the unsaturated carboxylic acid so long as it has a carboxyl group and a polymerizable unsaturated group in the molecule and there can be preferably mentioned, for example, an unsaturated monocarboxylic acid such as (meth)acrylic acid or crotonic acid, an unsaturated dicarboxylic acid such as maleic acid, fumaric acid or itaconic acid, as well as a half esterification product of such unsaturated dicarboxylic acid. They may be used alone or two or more of them may be used in combination.

As the polymerizable monomer ingredient (A), the unsaturated carboxylic acid as described above may be used alone or a polymerizable monomer other than the unsaturated carboxylic acid may be used together in an appropriate amount if necessary. There is no particular restriction for the polymerizable monomer usable together, so long as it has a copolymerizability with unsaturated carboxylic acid and there can be mentioned, for example, styrenic derivatives such as styrene, vinyltoluene, α-methylstyrene, chloromethylstyrene, styrene sulfonic acid or a salt thereof; (meth)acrylic amide derivatives such as (meth)acrylamide, N-monomethyl(meth) acrylamide, N-monoethyl(meth) acrylamide, N,N-dimethyl(meth)acrylamide; (meth)acrylic acid esters such as methyl(meth)acrylate, ethyl(meth) acrylate or butyl(meth)acrylate synthesized by esterifying reaction between (meth)acrylic acid and an alcohol of 1 to 18 carbon atoms; hydroxyl group-containing (meth)acrylic acid esters such as 2-hydroxyethyl(meth)acrylate, 2-hydroxypropyl(meth)acrylate or mono-ester of (meth) acrylic acid when polypropylene glycol or polyethylene glycol: and (meth)acryloyl oxyethane sulfonic acid and a salt thereof, vinyl sulfonic acid and a salt thereof, vinyl aetate and (meth)acrylonitrile. One or more of them can be used.

The amount of other polymerizable monomer than the unsaturated carboxylic acid to be used should be determined such that the acid value of the resulting end alkyl group-containing polymer (Pa) is not less than 200. Further, the kind and the amount are preferably adjusted while also considering the compatibility with a polymer formed upon conducting emulsion polymerization using the resultant end alkyl group-containing polymer (Pa) as an emulsifier.

Then, as the alkylmercaptan (B) used upon producing the end alkyl group-containing polymer (Pa), there can be mentioned, for example, n-hexyl mercaptan, n-octyl mercaptan, n-dodecyl mercaptan, t-dodecyl mercaptan, cetyl mercaptan and stearyl mercaptan which may also be used alone or two or more of them may be used together.

The alkyl mercaptan (B) is used for introducing an alkyl group to the terminal end of the polymer (Pa) thereby providing the surface activity. An alkyl mercaptan with less than 6 carbon atoms is not preferred since the stability on emulsion polymerization and storage stability are deteriorated. The amount of the alkyl mercaptan (B) used should be determined depending on the molecular weight of the polymer (Pa) and it is usually used within a range from 2 to 300 parts by weight based on 100 parts by weight of the polymerizable monomer ingredient (A).

As the polymerization initiator used for the polymerization of the polymerizable monomer ingredient (A) a well-known oil soluble or water soluble polymerization initiator can be used and the amount of the initiator used for efficient preparation of the end alkyl group-containing polymer (Pa) is preferably from less than 1 mol, more preferably less than 0.1 mol based on 1 mol of the alkyl mercaptan.

The polymer (Pa) can be prepared by any of methods such as bulk polymerization, solution polymerization or suspension polymerization. The polymerization temperature is usually from 50° to 150° C. and the polymerization time is generally about from 1 to 8 hours. As the solvent used for the solution polymerization, any kind of the solvents may be used so long as it can dissolve any of the polymerizable monomer ingredient (A), alkyl mercaptan (B) and the radical polymerization initiator and does not hinder the radical polymerization.

The polymer (Pa) has, by itself, sufficient surface activity but the effect as an emulsifier is further enhanced when it is used as a salt of the polymer (Pa) by partially or entirely neutralizing carboxyl groups. As the neutralizing agent used herein, there can be mentioned, for example, an alkali metal compound such as sodium hydroxide or potassium hydroxide; alkaline earth metal compound such as calcium hydroxide or calcium carbonate; ammonia; and water soluble organic amines such as monomethylamine, dimethylamine, trimethylamine, monoethylamine, diethylamine, trimethylamine, monopropylamine, dimethylpropylamine, monoethanolamine, diethanolamine, triethanolamine, ethylenediamine and diethylenetriamine. One or more of neutralizing agents selected from the group described above may be used. In a case where metal ions in the epoxy resin curing product lead to a problem, ammonia or low boiling amines such as monomethylamine, dimethylamine or trimethylamine that scatter under a normal temperature upon heating may be used preferably.

Among the polymer (Pa) and/or salt thereof, those represented by the following general formula (I) can be mentioned as preferred:

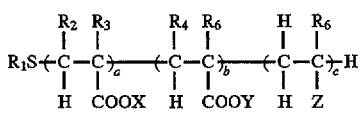

wherein $R_1$ represents an alkyl group of 6 to 18 carbon atoms, $R_2$, $R_3$, $R_4$, $R_5$ and $R_6$ represent, independently, a hydrogen atom, a methyl group, carboxyl group or carboxymethyl group or a salt thereof, X represents a hydrogen atom, ammonium group, amine base, alkali metal or alkaline earth metal, Y represents a hydrocarbon group having a polymerizable unsaturated group, Z represents a nitrile group or a phenyl group, amide group or carboxylic acid alkyl ester group which may have a substituent, a is an integer of 1 to 500, b is 0 or an integer of 1 to 100 and c is 0 or an integer of 1 to 250.

Then, as the monomer (C) used for the preparation of the (meth)acrylic acid ester polymer particles (Pb), there can be mentioned (meth)acrylic acid esters of linear or branched aliphatic alkyl alcohol or cycloaliphatic alkyl alcohol with 1 to 18 carbon atoms such as methyl, ethyl, propyl, isopropyl, butyl, isobutyl, octyl, 2-ethylhexyl, lauryl, stearyl or cyclohexyl and (meth)acrylate; hydroxyl group-containing unsaturated monomers such as hydroxyethyl (meth)acrylate, hydroxypropyl (meth)acrylate or a (meth)acrylate of polypropylene glycol or polyethylene glycol; epoxy group-containing unsaturated monomers such as (meth)glycidyl acrylate; adirizinyl group-containing unsaturated monomers such as (meth)acryloyl aziridine and (meth)acryloyloxyethyl aziridine; oxazoline group-containing unsaturated monomers such as 2-isopropenyl-2-oxazoline or 2-vinyl-2-oxazoline; polyfunctional (meth)acrylic acid esters containing two or more polymerizable unsaturated groups in the molecule, for example, esters of (meth)acrylic acid with ethylene glycol, 1,3-butylene glycol, 1,6-hexylene glycol, neopentyl glycol, polyethylene glycol, polypropylene glycol, or trimethyrol propane; and allyl (meth)acrylate. They may be used either alone or two or more of them may be used together for copolymerization. Further, other copolymerizable monomers, for example, styrene, vinyl toluene, acrylonitrile, meth-acrylonitrile, vinyl acetate, divinyl benzene or diallyl phthalate may be copolymerized in an appropriate amount.

Upon preparing (meth)acrylic acid ester polymer particles (Pb), it is necessary to consider the kind and the composition of the monomer (C) such that the glass transition temperature of the resultant polymer particles (Pb) is lower than 20° C. If the glass transition temperature of the polymer particles (Pb) exceeds 20° C., no sufficient effect for improving the toughness can be obtained. In view of making the toughness of the resultant epoxy resin composition more excellent, more preferred glass transition temperature of the polymer particles (Pb) is lower than 0° C.

The effect for improving the toughness is improved more as the glass transition temperature of the polymer particles (Pb) is lower. However, the lower limit for the glass transition temperature of the polymer particles (Pb) obtained by polymerization of (meth)acrylic acid ester monomers commercially available at present is about −80° C. and it is difficult at present to obtain (meth)acrylic acid ester type polymer particles having the glass transition temperature lower than that.

Further, in a case of using a monomer (C) having a functional group capable of reacting with a carboxyl group as the (meth)acrylic ester monomer (C), since the emulsifier described above having the carboxyl group and the (meth) acrylic acid ester type polymer particles (Pb) are bonded firmly, the effect of improving the toughness of the epoxy resin is enhanced more. As such a monomer (C), epoxy group-containing polymerizable monomers, aziridinyl group-containing polymerizable monomers and oxazoline group-containing polymerizable monomers can be mentioned as preferred among those exemplified above as the monomer (C).

Further, introduction of an appropriate extent of crosslinking structure into the (meth)acrylic acid ester type polymer particles (Pb) is effective for enhancing the toughness of the epoxy resin. As the polymerizable monomer (C) to which the crosslinking structure can be introduced, there can be exemplified, preferably polyfunctional (meth)acrylic acid ester, divinyl benzene, diallylphthalate and allyl(meth) acrylate having two or more polymerizable unsaturated groups in the molecule among those exemplified above as the monomer (C). However, the amount of use should be kept to about 0.5–10 parts by weight and, if it exceeds 10 parts by weight, the effect of improving the toughness tends to be reduced rather.

There is no particular restriction on the emulsion polymerization and all of emulsion polymerization methods known so far are applicable. For instance, (meth)acrylic acid ester type polymer particles (Pb) can be synthesized by a method of mixing together the above-mentioned end alkyl group-containing polymer (Pa) acting as an emulsifier, the polymerizable monomer (C) described above, a polymerization catalyst and water, a so-called monomer dropping method, pre-emulsion method and, further, a seed polymerization method or multi-stage polymerization method. Polymerization is conducted usually at 0°–100° C., preferably, at 50°–80° C., and about 1–10 hours of polymerization time is sufficient.

There is no particular restriction on the amount of the polymer (Pa) is used as the emulsifier and it ranges, preferably, from 0.5 to 10 parts by weight, more preferably, from 1 to 3 parts by weight, based on 100 parts of the polymerizable monomer (C). In the production step for the epoxy resin composition as described later, a defoamer which is used with an aim of suppressing foaming due to emulsifier caused upon distilling off water causes, as an impurity, reduction of physical properties of an epoxy resin curing product. However, if the amount of the polymer (Pa) used is kept within 3 parts by weight, since foaming scarcely occurs also upon dewatering, there is no requirement for using the defoamer and no reduction of the physical property is caused to the epoxy resin curing product.

All of known polymerization catalysts can be used upon emulsion polymerization and, if there is a risk that alkali metal or chlorine ions may give an undesired effect on the epoxy resin curing product as it is desired to use such a polymerization catalyst and hydrogen peroxide, peracetic acid, di-t-butyl peroxide, 4,4'-azobis(4-cyano pentanoic acid).

There is also no particular restriction on the epoxy resin used in the present invention and known epoxy resins can be used by properly selecting in accordance with the application use and characteristics required. For instance, there can be mentioned glycidyl ethers of phenols such as bisphenol A, bisphenol F, phenol novolak, cresol novolak or brominated bisphenol A; glycidyl ethers of alcohols such as butanol, butanediol, polyethylene glycol or propylene glycol; and glycidyl esters of acids such as hexahydrophthalic acid or dimeric acid, which can be used alone or two or more of them may be used in combination.

When the epoxy resin composition according to the present invention is prepared, the following method is recommended in view of simplifying the step and preventing the inclusion of impurities. That is, this is a method of directly mixing an emulsion of (meth)acrylic acid ester type polymer particles (Pb) with the epoxy resin described above and removing water while stirring under a normal pressure or a reduced pressure.

In the methods proposed so far, a plurality of steps of coagulating to precipitate emulsified rubber particles by adding a metal-containing coagulant or by utilizing a clouding point of a nonionic emulsifier, drying and then dispersing them into an epoxy resin, which makes the step complicate, as well as may deteriorate the physical property of the epoxy resin curing product by the inclusion of metal ions in the composition.

However, when the production method as described above in accordance with the present invention is adopted, a resin composition in which the (meth)acrylic acid ester type polymer particles (Pb) are uniformly dispersed in the epoxy resin can be obtained simply in one step. In this case, if the dispersion is intended to obtain in the same manner by using a usual low molecular weight emulsifier as the emulsifier, since remarkable foams are formed upon removal of water, which overflow from a container, dewatering is made virtually impossible.

The reason why such a simple and convenient production method can be attained in accordance with the present invention may be because there is less foaming in the dewatering step since the polymer (Pa) used as the emulsifier has a high molecular weight and is firmly bonded to the polymer particles (Pb), as well as the polymer (Pa) has satisfactory dispersibility since it has reactivity with the epoxy resin.

Upon production of the epoxy resin composition, an emulsion of an epoxy resin and (meth)acrylic acid ester polymer particles (Pb) are charged in a vessel equipped with a stirrer and a water removal port, and water may be removed by stirring at 0°–150° C., preferably, 50°–130° C., under a reduced pressure of 1 mmHg–760 mmHg or under an atmospheric pressure, preferably, under reduced pressure of 30 mmHg to 600 mmHg.

The amount of the (meth)acrylic acid ester polymer particles (Pb) dispersed in the epoxy resin is preferably from 1 to 50 parts by weight, more preferably, 2 to 30 parts by weight as the solid content based on 100 parts by weight of the epoxy resin. If the amount of the (meth)acrylic acid ester type polymer particles (Pb) is less than 1 parts by weight, the effect of improving the toughness can scarcely be obtained. On the other hand, if it exceeds 50 parts by weight, the viscosity of the epoxy resin composition increases excessively to deteriorate the property inherent to the epoxy resin.

It is of course possible to blend a filler or a pigment such as quartz glass powder, silica, clay, calcium carbonate, kaolin, talc, titanium oxide or aluminum hydroxide as necessary to the thus obtained epoxy resin composition according to the present invention.

The epoxy resin composition according to the present invention can be used to various application uses in combination with various kinds of curing agents. As the curing agent, there can be mentioned, for example, linear aliphatic amines such as diethylenetriamine, triethylenetetramine, tetraethylenepentamine and diethylaminopropylamine; various kinds of polyamides of different amine values; cycloaliphatic amines such as menthenediamine, isophorone diamine and bis(4-aminocyclohexyl)methane; aromatic amines such as m-xylenediamine, diaminodiphenyl methane, diaminodiphenyl sulfone and m-phenylenediamine; acid anhydrides such as phthalic acid anhydride, tetrahydrophthalic acid anhydride, hexahydrophthalic acid anhydride, methyltetrahydrophthalic acid anhydride, methylhexahydrophthalic acid anhydride, methylnadic acid anhydride, dodecyl succinic acid anhydride, pyromellitic acid anhydride, methylcyclohexene tetracarboxylic acid anhydride, trimellitic acid anhydride, and polyazelaic acid anhydride; phenolic hydroxy group-containing compounds such as phenol novolak, cresol novolak; and polymercaptanes; anionic polymerization catalysts such as 2,4,6-tris (dimethylaminomethyl)phenol and 2-ethyl-4-methylimidazole; cationic polymerization catalysts such as $BF_3$ monoethylamine complex; and latent curing agents typically represented, for example, by dicyandiamide, amine adduct, hydrazide, amideamine, block isocyanate, carbamates, ketimine or aromatic diazonium salt, which may be used alone or as a mixture of two or more of them.

EXAMPLE

Description will now be made more specifically to the present invention with reference to examples but the present invention is not restricted only to the following examples. In the examples, "%" and "parts" mean "% by weight" and "parts by weight" unless otherwise specified.

REFERENCE EXAMPLE 1

(Preparation of Emulsifier)

To a flask equipped with a stirrer, a reflux cooler, a nitrogen introduction pipe, a thermometer and a dropping funnel, 180 parts of isopropanol was charged and temperature was elevated up to 81° C. while blowing nitrogen, to reflux isopropanol for 10 min. Then, a previously prepared polymerizable monomer mixture comprising 53.6 parts of acrylic acid, 16.5 parts of lauryl methacrylate, 91 parts of Blemmer-PE-200 (polyethylene glycol monomethacrylate, manufactured by Nippon Yushi Co.), 13.7 parts of n-dodecylmercaptan and 0.4 parts of 2,2'-azobisisobutyronitrile (AIBN) was dropped into the flask for 2 hours. After the completion of the dropping, they were aged for one hour under reflux, to obtain a solution of an end alkyl group-containing polymer (Pa-1) of 49.1% solid content. The polymer (Pa-1), had the chemical structure as illustrated by the following formula, had an acid value of 239 and a number average molecular weight of 2300.

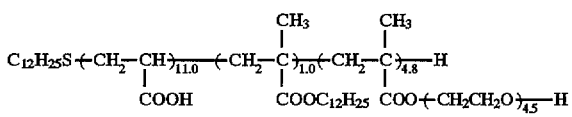

REFERENCE EXAMPLE 2

(Preparation of Emulsifier)

Polymerization was conducted in the same manner as in Reference Example 1 except for using a polymerizable monomer mixture comprising 70 parts of methacrylic acid, 91 parts of Blemmer-PE-200 (as described above), 17 parts of n-dodecylmercaptan and 0.4 parts of AIBN. And 12 parts of glycidyl methacrylate and 0.5 parts of triethylbenzylammonium chloride were added to the above obtained polymer mixture, and was reacted for 6 hours at 85° C., to give a solution of an end alkyl group-containing polymer (Pa-2) with 51.6% of solid content. The polymer (Pa-2), had the chemical structure as illustrated by the following formula, had an acid value of 286 and a number average molecular weight of 2200.

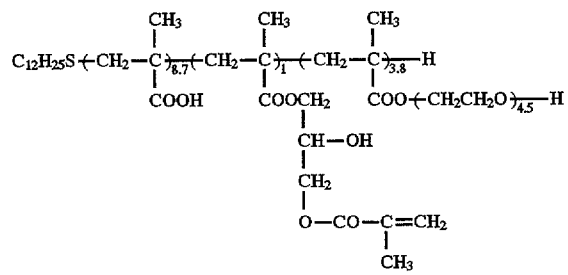

REFERENCE EXAMPLE 3

(Preparation of Emulsifier)

Polymerization was conducted in the same manner as in Reference Example 1 except for using a polymerizable monomer mixture comprising 145 parts of acrylic acid, 16 parts of styrene, 18 parts of stearyl mercaptan and 0.4 parts of AIBN., to obtain an end alkyl group-containing polymer (Pa-3) with 49.6% of solid content. The polymer (Pa-3), had the chemical structure as illustrated by the following formula, had an acid value of 630 and a number average molecular weight of 2800.

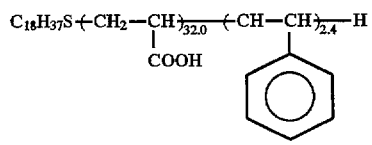

EXAMPLES 1–5 AND COMPARATIVE EXAMPLES 1–7

(1) Preparation of (meth)acrylic acid ester polymer

To a flask equipped with a dropping funnel, a stirrer, a nitrogen introduction pipe, a thermometer and a reflux cooler, 63 parts of purified water were charged and heated up to 70° C. while moderately blowing a nitrogen gas.

On the other hand, 85 parts of ethylacrylate, 10 parts of methylmethacrylate, 5 parts of glycidyl methacrylate, 4.1 parts of a solution of the end alkyl group-containing polymer obtained in the Reference Example 1 (Pa-1), 0.5 parts of an aqueous 28% ammonium solution and 36 parts of ion exchanged water were previously stirred thoroughly into a completely emulsified pre-emulsion, which was charged into the dropping funnel.

Then, after charging 8 parts of an aqueous 5% solution of 4,4'-azobis(4-cyano pentanoic acid) neutralized with ammonia into the flask, the pro-emulsion described above was dropped from the dropping funnel for three hours and 30 min. After the completion of the dropping, the dropping funnel was washed with 10 parts of ion exchanged water so as not to leave the pre-emulsion and the washing solution was added in the flask. During dropping of the pro-emulsion, the temperature was kept at 70°–75° C. After completion of the dropping, stirring was further continued for 2 hours at that temperature to complete the polymerization, and a (meth)acrylic acid ester polymer emulsion (1) with 46.0% non-volatile component was obtained.

Further, (meth)acrylic acid ester polymer emulsions (2)–(5) and comparative emulsions (C1)–(C4) were obtained in the same manner as described above except for replacing the end alkyl group-containing polymer solution and the polymerizable monomer ingredient used as the emulsifier with those shown in Table 1. In Table 1, the glass transition temperature of the emulsion polymer particles was measured after evaporating to remove water from the emulsion by using a differential scanning calorimeter (DSC-7), manufactured by Perkin Elmer Co.

TABLE 1

| (Meth)acrylate polymer emulsion | [1] | [2] | [3] | [4] | [5] | Comparison [C1] | Comparison [C2] | Comparison [C3] | Comparison [4] |
|---|---|---|---|---|---|---|---|---|---|
| Polymerizable monomoer composition (parts) | | | | | | | | | |
| Butyl acrylate | — | 57 | 60 | 46 | 25 | 57 | 57 | — | — |
| Ethyl acrylate | 85 | 29 | — | 30 | 30 | 29 | 29 | 85 | 30 |
| Methyl methacrylate | 10 | 10 | — | 10 | 35 | 10 | 5 | 10 | 60 |
| Styrene | — | — | 25 | 10 | 8 | — | — | — | — |
| Acrylonitrile | — | — | 15 | — | — | — | — | — | — |
| Glycidyl methacrylate | 5 | — | — | — | — | — | — | 5 | — |
| 2-isopropenyl-2-oxazoline | — | 2 | — | — | — | 2 | — | — | — |
| Methacrylic acid | — | — | — | — | — | — | 6 | — | — |
| Allyl methacrylate | — | 2 | — | — | 2 | 2 | — | — | 10 |
| Ethylene glycol diacrylate | — | — | — | 2 | — | — | 2 | — | — |
| End alkyl group-containing polymer solution | | | | | | | | | |
| (Pa-1) | 4.1 | — | — | 3 | 3 | — | — | — | 3 |
| (Pa-2) | — | 3 | 3 | — | — | — | — | — | — |
| (Pa-3) | — | — | 3 | — | — | — | — | — | — |
| 28% aqueous ammonia sol. | 0.5 | 0.5 | 1.0 | 0.4 | 0.4 | — | — | — | 0.4 |
| Sodium dodecyl sulfate | — | — | — | — | — | — | 1.5 | — | — |

TABLE 1-continued

| (Meth)acrylate polymer emulsion | [1] | [2] | [3] | [4] | [5] | Comparison [C1] | Comparison [C2] | Comparison [C3] | Comparison [4] |
|---|---|---|---|---|---|---|---|---|---|
| Hightenol No. 8[(1)] | — | — | — | — | — | 1.5 | — | 1.5 | — |
| Non-volatile component conc. (%) | 46.0 | 45.7 | 45.1 | 45.8 | 45.6 | 46.7 | 46.5 | 46.5 | 46.0 |
| Viscosity (25° C., CPS) [(2)] | 20 | 12 | 25 | 15 | 15 | 20 | 21 | 25 | 18 |
| Glass transition temperature or polymer | −8 | −32 | −14 | −15 | 15 | −29 | −20 | −10 | 70 |

[(1)]Ammonium alkylphenyl polyethyleneoxide sulfonate, manufactured by Daiichi Kogyo Seiyaku Co.
[(2)] B type viscometer #1, measured at 60 rpm (2) Preparation of Epoxy Resin Composition The (meth)acrylic acid ester polymer emulsions (1)–(5) and the Comparative emulsions (C1)–(C-4) obtained in (1) above were charged in a flask equipped with a stirrer, a nitrogen introduction pipe and a condenser, to which ion exchange water was added to adjust the non-volatile component concentration to 30%. It was stirred with addition of a predetermined amount of Epicoat 828 (bisphenol A epoxy resin, manufactured by Yuka Shell Epoxy Co.), to obtain a homogeneous viscous solution. Then, it was elevated to 70° C. and water was removed while gradually increasing the degree of pressure reduction and finally reducing the pressure to 50 mmHg. Subsequently, water was completely removed by heating up to 130° C. and the carboxyl groups and the epoxy resin in the emulsion (end alkyl group-containing polymer) were put to previous reaction.

Table 2 shows the constitution of the resultant epoxy resin composition (measuring method was as shown below). Since the compositions using the Comparative emulsions (C1)–(C3) showed remarkable foaming upon dewatering and water could not be removed to the last, same procedures were applied after adding 0.3 parts of Sunnopco 8034L (manufactured by Sunnopco Co.) as a defoamer.

(Water Content in Epoxy Resin Composition)

Water content in the epoxy resin composition was measured by using a Karl-Fisher Moisture Meter (Kyoto Electroncis MKS-3p).

(Reactivity of Carboxyl Group in Emulsifier)

Amount of carboxyl groups per 1 g of the (meth)acrylic acid ester type polymer particles was measured before and after the epoxy resin dispersion by titration with 0.1N-NaOH, and the reactivity was calculated based on the ratio.

$$\frac{\text{Amount of carboxyl groups before dispersion} - \text{Amount of carboxyl groups after dispersion (mol/g)}}{\text{Amount of carboxyl groups before dispersion (mol/g)}} \times 100 = \text{reactivity of carboxyl groups in emulsifier (\%)}$$

(Epoxy Equipment)

Epoxy equivalent was measured by reacting HCl/THF and back titrating excess HCl.

(3) Property of Curing Product of Epoxy Resin Composition (Adhesion Test)

The epoxy resin composition obtained in (2) above was mixed with the curing agent at a ratio shown in Table 2 and adhesion test was conducted. As an adherend, a cold rolled steel plate of 1.5 mm thickness (0.5 mm thickness for T-type peeling test) was polished with #100 sand paper and washed with acetone for degreasing was used. The adhesive was cured after heating at 80° C. for one hour and further heating at 150° C. for 0.5 hours, and the results are also shown in Table 2.

Tensile Shearing Strength:
According to JIS K 6850. Tensile speed: 10 mm/min
Warm Water Resistance:
After immersing in warm water at 80° C. for 24 hours, strength was measured at normal temperature (23° C.) to examine warm water resistance.
T-type Peeling Strength:
According to JIS K 6854. Tensile speed: 50 mm/min

TABLE 2

| | Example 1 | Example 2 | Example 3 | Example 4 | Example 5 | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|---|---|
| Epoxy Resin Composition | | | | | | | | | | | | |
| Epicoat 828 (parts) | 80 | 80 | 80 | 80 | 80 | 100 | 80 | 80 | 80 | 80 | 80 | 80 |
| (meth)acrylate polymer | [1] | [2] | [3] | [4] | [5] | — | CTBN 1 [(2)] | CTBN 2 [(3)] | [C1] | [C2] | [C3] | [C4] |
| Weight of particle (parts) | 20 | 20 | 20 | 20 | 20 | — | 20 | 20 | 20 | 20 | 20 | 20 |
| Water content (%) | 0.03 | 0.04 | 0.06 | 0.04 | 0.06 | — | — | — | 0.05 | 0.06 | 0.05 | 0.03 |
| Carboxyl group reactivity (%) | 49 | 50 | 49 | 52 | 55 | — | — | — | — | — | — | 49 |
| Epoxy equivalent | 229 | 228 | 229 | 230 | 230 | 187 | 230 | 228 | 229 | 227 | 228 | 229 |
| Curing agent [(1)] (parts) | 52 | 52 | 52 | 52 | 52 | 65 | 52 | 52 | 52 | 52 | 52 | 52 |
| Tensile shearing strength (kg/cm$^2$) | 266 | 277 | 242 | 245 | 240 | 181 | 275 | 269 | 242 | 228 | 233 | 210 |
| Warm water tensile shearing strength at 80° C. | 188 | 190 | 186 | 175 | 181 | 127 | 75 | 81 | 150 | 145 | 160 | 120 |

TABLE 2-continued

|  | Example 1 | Example 2 | Example 3 | Example 4 | Example 5 | Comp. Example 1 | Comp. Example 2 | Comp. Example 3 | Comp. Example 4 | Comp. Example 5 | Comp. Example 6 | Comp. Example 7 |
|---|---|---|---|---|---|---|---|---|---|---|---|---|
| T-type peeling strength (kg/25 mm²) | 6.0 | 6.3 | 5.0 | 5.5 | 4.5 | 2.1 | 2.4 | 3.7 | 3.9 | 3.8 | 4.0 | 2.0 |

(1) HV-953U: Amideamine type curing agent, manufactured by Chiba Guigy (Japan) Ltd.
(2) CTBN1: HYCAR CTBN 1300 × 8 available from Ube Kosan Co.
(3) CTBN2: HYCAR CTBN 1300 × 8 in which carboxyl groups are pretreated by Epicoat 828 (at 150° C. for 3 hr)

As apparent also from Table 2, the epoxy resin composition according to the present invention shows less reduction of the tensile shearing strength after immersion in warm water at 80° C. and excellent T-type peeling strength.

EXAMPLES 6–12 AND COMPARATIVE EXAMPLES 8–12

(1) Preparation of (Meth)acrylic Acid Ester Type Polymer (Meth)acrylate ester type polymer emulsions (1)–(5) and (C1)–(C4) shown in Table 1 were used.

(2) Preparation of Epoxy Resin Composition

Epoxy resin compositions were prepared in the same manner as in Examples 1–5 and Comparative Examples 1–7. Table 3 shows the constitution of the resultant epoxy resin compositions.

(3) Property of Curing Product of Epoxy Resin Composition

The epoxy resin compositions obtained in (2) above were molded after mixing with the curing agent at a blending ratio shown in Table 3 and various physical property tests were conducted for the molding products and the results are also shown in Table 3. The molding products were cured by heating at 85° C. for 3 hours and, further, heating at 150° C. for 3 hours.

(Value of Fracture Toughness)

A test specimen of a size shown in FIG. 1 was prepared and, after forming a starter crack with a razor blade at the top end of a central notch, a load-time curve was determined at 10 mm/min rate (FIG. 2) and the fracture toughness value was calculated based on load (Pc) and crack length (a) upon fracture in accordance with the following equation.

$$\text{Value Fracture Toughness} = \frac{3Pc \cdot S}{2BW^2} \cdot \sqrt{a} \cdot f(x) \quad (\text{MPa}\sqrt{m})$$

f(x) is a shape factor represented by the following equation and x=a/w $$f(x) = 1.93 - 3.07x + 14.53x^2 - 25.11x^3 + 25.80x^4$$

(Load Distortion Temperature)

The load distortion temperature was measured according to JIS K 7207 by using a H.D.T. & V.S.P.T. Tester manufactured by Toyo Seiki Co.

(Water Absorption Ratio)

A water absorption ratio when a specimen of 3 mm thickness was immersed in a warm water at 80° C. for 24 hours was measured and the ratio was determined in accordance with the following equation.

$$\frac{\text{Weight after immersion in warm water (g)} - \text{Weight before immersion in warm water (g)}}{\text{Weight before immersion warm water (g)}} \times 100 = \text{Water absorption ratio (\%)}$$

TABLE 3

|  | Example 6 | Example 7 | Example 8 | Example 9 | Example 10 | Example 11 | Example 12 | Comp. Example 8 | Comp. Example 9 | Comp. Example 10 | Comp. Example 11 | Comp. Example 12 |
|---|---|---|---|---|---|---|---|---|---|---|---|---|
| Epoxy Resin Composition | | | | | | | | | | | | |
| Epicoat 828 (parts) | 80 | 70 | 90 | 80 | 80 | 75 BGE²⁾ 5 | | 100 | 80 | 80 | 80 | |
| (Meth)acrylate type polymer | [2] | [4] | [2] | [1] | [3] | [2] | [5] | — | CTBN²⁾ 2 | Comparison [C1] | Comparison [C2] | Comparison [C4] |
| Weight of particle (parts) | 20 | 30 | 10 | 20 | 20 | 20 | 20 | — | 20 | 20 | 20 | 20 |
| Water content (%) | 0.04 | 0.06 | 0.06 | 0.03 | 0.06 | 0.04 | 0.06 | — | — | 0.05 | 0.06 | 0.03 |
| Carboxyl group reactivity (%) | 50 | 45 | 55 | 49 | 49 | 50 | 55 | — | — | — | — | 49 |
| Epoxy equivalent | 228 | 262 | 210 | 229 | 229 | 228 | 230 | 187 | 228 | 229 | 227 | 229 |
| Curing agent⁽¹⁾ (parts) | 20 | 17 | 22 | 20 | 20 | 20 | 20 | 25 | 20 | 20 | 20 | 20 |
| Fracture toughness value (Mpa√m) | 1.7 | 2.3 | 1.4 | 1.5 | 1.4 | 3.2 | 1.4 | 1.1 | 1.4 | 1.4 | 1.4 | 1.0 |
| Load distortion temperature (°C.) | 165 | 158 | 170 | 164 | 167 | 136 | 168 | 171 | 120 | 151 | 150 | 169 |
| Water absorption ratio (%) | 0.66 | 0.78 | 0.55 | 0.68 | 0.69 | 0.70 | 0.67 | 0.52 | 1.10 | 1.01 | 1.08 | 0.66 |

⁽¹⁾Diaminodiphenyl methane
⁽²⁾BGE: Butyl glycidyl ether
⁽³⁾CTBN2: HYCAR CEBN 1300 × 8 in which carboxyl grups are pre-treated by Epicoat 828 (at 150° C. for 3 hr.)

As apparent also from Table 3, in the epoxy resin composition according to the present invention, the value of fracture toughness is improved without reducing the load distortion temperature and the water absorption ratio is also excellent as compared with that of existent materials. Further, as apparent from comparison between Example 11 and Comparative Example 10, when comparison is made under the same extent of load distortion temperature, the curing product of the epoxy resin composition according to the present invention has value of fracture toughness which is greater by more than twice of that of the epoxy resin which is improved with the toughness by CTBN rubber.

EFFECT OF THE INVENTION

The epoxy resin composition according to the present invention comprises an epoxy resin in which (meth)acrylic acid ester type polymer particles are homogeneously dispersed uniformly and, there is scarce fluctuation for the effect of improving the toughness depending on the curing condition as in existent epoxy resin compositions improved with the toughness by the addition of dissolving and reaction depositing type rubber, as well as it shows no reduction in the heat resistance since the rubber ingredient is not substantially solved into the epoxy resin. In addition, as compared with the existent resin composition improved with the toughness by the rubber particle emulsion addition method, the resin composition of the present invention shows an excellent effect for improving the toughness with a smaller amount of blend since no shell ingredient is present.

Further, by using the end alkyl group-containing polymer of a specific structure as the emulsifier, foaming upon dewatering in preparing the epoxy resin composition can be suppressed making the production remarkably simple and convenient. Further, since the end alkyl group-containing polymer used as the emulsifier has a reactivity with the epoxy resin and it is also distributed in a bonded state in the epoxy resin, the resultant epoxy resin composition is tough and excellent in the water resistance (humidity resistance) and adhesion, which can be utilized effectively, for example, as adhesives, molding materials, paints and sealants.

We claim:

1. An epoxy resin composition, comprising:

an epoxy resin phase, and (meth)acrylic acid ester polymer particles (Pb) homogeneously dispersed in the epoxy resin phase, the (meth) acrylic acid ester polymer particles (Pb) having a glass transition temperature of less than 20° C. and having attached to the surface thereof a reactive surface active agent which is a water soluble or water dispersible end alkyl group-containing polymer (Pa), optionally partially or entirely neutralized in the form of a salt, having an acid value of greater than 200 and a number average molecular weight of from 300 to 7,000, the (meth)acrylic acid ester polymer particles (Pb) being obtained by emulsion polymerization of a (meth) acrylic acid ester monomer (c) using the reactive surface active agent as an emulsifier, the water soluble or water dispersible end alkyl group-containing polymer (Pa) being obtained by polymerization of a polymerizable monomer ingredient (A) containing an unsaturated carboxylic acid as an essential ingredient in the presence of an alkyl mercaptan (B) of 6–18 carbon atoms, and the carboxylic acid groups of the reactive surface active agent being reactive with the epoxy groups of the epoxy resin phase.

2. An epoxy resin composition as defined in claim 1, wherein the emulsifier is the polymer represented by the following general formula (I) which is partially or entirely neutralized in the form of a salt

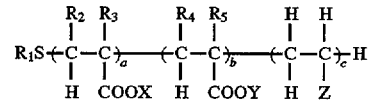

where $R_1$ represents an alkyl group of 6 to 18 carbon atoms, $R_2$, $R_3$, $R_4$, $R_5$ and $R_6$ represent, independently, a hydrogen atom, a methyl group, carboxyl group or carboxy-methyl group or a salt thereof, X represents a hydrogen atom, ammonium group, amine base, alkali metal or alkaline earth metal, Y represents a hydrocarbon group having a polymerizable unsaturated group, Z represents a nitrile group or a phenyl group, amide group or carboxylic acid alkyl ester group which may have a substituent, a is an integer of 1 to 500, b is 0 or an integer of 1 to 100 and c is 0 or an integer of 1 to 250.

3. An epoxy resin composition as defined in claim 1 or 2, wherein the (meth)acrylic acid ester polymer particles (Pb) have a crosslinked structure.

4. An epoxy resin composition as defined in any one of claim 1 or 2 wherein the (meth)acrylic acid ester polymer particles (Pb) have functional groups capable of reacting with carboxyl groups in polymer (Pa).

* * * * *